United States Patent Office 3,510,459
Patented May 5, 1970

3,510,459
CONVERSION OF HYDROXYLIC POLYMERS TO CARBOXYLIC POLYMERS
John M. Mersereau, Cheshire, Conn., assignor to Uniroyal, Inc., New York, N.Y., a corporation of New Jersey
No Drawing. Filed Jan. 15, 1968, Ser. No. 697,579
Int. Cl. C08d 5/02; C08f 27/00
U.S. Cl. 260—78.4
5 Claims

ABSTRACT OF THE DISCLOSURE

Conversion of polymers having hydroxy functionality to ones having carboxy functionality by means of anhydrides and non-hydrogen halogen containing Lewis acids.

This invention relates to a process for the conversion of hydroxy terminated polymers to carboxy terminated polymers.

More specifically, the invention relates to the use of Lewis acids such as zinc chloride for the preparation of polymers such as $\alpha,\omega$-dicarboxy polybutadiene from $\alpha,\omega$-dihydroxy polybutadiene.

BACKGROUND OF THE INVENTION

Present carboxy polymers have a random distribution of carboxy molecules along the chain. The vulcanized properties of such compounds are poor as they exhibit a modulus of less than 50 lbs./sq. in.

Polymers which are terminated by a carboxy molecule react with a suitable curing agent to form high molecular weight vulcanized polymer with better physical and mechanical properties.

Thus, an object of the instant invention is to produce dicarboxylic terminated polymers which may be cured to high molecular weight materials. These high molecular weight products may be used as flexible backbone for graft polymers or as a solid fuel binder.

A feature of the present invention is that it utilizes as a starting material a very easily obtainable starting material, i.e., soluble hydroxy terminated polymers.

Such starting materials may be obtained by emulsion polymerization of suitable conjugated dienes in the presence of cyclohexanone peroxide and ferrous ions.

The starting material hydroxy polymers may be completely functionally terminated with hydroxy end groups or may contain carboxyl end groups. Generally the hydroxy functionality ranges from 0.5 to 1.8.

The degree of polymerization of the hydroxy terminated polymer may range from 5 to 100 but is preferably within the range of 10 to 25.

The degree of polymerization of the final product is identical to that of the starting material is only the terminal groups are substituted, and there is no affect on the polymer structure.

An anhydride and Lewis non-hydrogen acid in combination effect the conversion of hydroxy terminated polymers to carboxy terminated polymers.

Those Lewis acids which may be used include non-hydrogen acids such as boron fluoride, stannic chloride and preferably zinc chloride. These include those non-hydrogen Lewis acids which are weaker than aluminum chloride or sulfuric acid.

When catalysts other than these are employed esterification of carboxyl end group is catalyzed. The reaction of the anhydride increases the polymer molecular weight only by an increment of two anhydride units. Esterification of the resulting polymeric acid would cause a doubling of the molecular weight. The above-mentioned catalysts are used to avoid this secondary reaction and also avoid gelation which would otherwise be caused. The catalysts are used in amounts ranging from 2.1 to 2.3 moles of catalyst per mole of hydroxy terminated polymer, although this is not critical to a successful operation of this process, and amounts varying from 1 to 4 moles of catalyst per mole of polymer may be successfully used.

Among the anhydrides which would be useful in the present invention are maleic anhydride, phthalic anhydride, and particularly succinic anhydride. The anhydride, as the catalyst, is present in molar excess amounts preferably ranging from 2.0 to 2.3 moles of anhydride per mole of polymer, but as with the catalyst the proportion is not critical.

Only the anhydride compounds may be used to effect the desired conversion as the use of an acid is prohibited by the fact that the Lewis acids used in the instant invention are not efficient acid/alcohol esterification catalysts.

Generally soluble elastomer forming hydroxy terminated polymers may be used as a starting material with polybutadiene diol being the preferable material. Examples of other suitable soluble hydroxy terminated polymers include hydroxy terminated polybutadiene, polyisoprene, polyisobutylene and poly(butadiene-co-styrene).

The general procedure to be followed in the process of converting hydroxy terminated polymers to carboxy terminated polymers is to place the polymer, Lewis-acid catalyst, and anhydride into a container together with a suitable high boiling point solvent in which rubbers are soluble to a high degree. Solvents which have been successfully used include trichloroethane, trichloroethylene and xylene. The solution is heated at temperatures ranging from 70° C. to 120° C. for several hours, washed with hot water and dried to produce the finished carboxy terminated product.

The following examples are illustrative of the process of this invention:

Example I.—Zinc chloride-catalyzed reaction

To a 200 ml. round bottom flask fitted with reflux condenser and heating mantle were added 80 ml. of dry trichloroethylene, 20 g. of polybutadiene diol, 2.74 g. of succinic anhydride, 0.3 g. of dry zinc chloride, and 0.6 g. of amine antioxidant. This mixture was refluxed four hours, washed with hot water, and dried over anhydrous potassium sulfate. Solvent was removed, in vacuo, leaving 12.0 g. of amber liquid only slightly more viscous than the diol substrate. The molecular weight of this product was 3150; there was no trace of OH in it judged by its infrared spectrum, and its functionality was 1.9. Essentially the same procedure was used four times to give in each case an entirely acceptable liquid $\alpha,\omega$-dicarboxy polybutadiene.

Example II.—Conversion of hydroxy-terminated polybutadiene to carboxy-terminated polybutadiene using stannic chloride catalysts To a flask fitted with a reflux condenser, thermometer, and heating mantle was added 60 g. of polybutadiene diol [intrinsic viscosity (I.V.) 0.15, 2.0 acid number, and microstructure containing 11.2% cis, 66.1% trans, and 22.7% vinyl units] dissolved in 240 ml. of dry trichloroethylene. To this was added 8.22 g. of succinic anhydride, 0.9 g. of zinc chloride, and 0.6 g. of amine antioxidant. The mixture was boiled for four hours (74–76° C.), filtered to remove a precipitate which had formed and thereafter 8 g. of succinic anhydride and 0.9 g. of fresh succinic anhydride were added. The dark red solution was boiled for one hour, cooled, and added to a separatory funnel in which it was washed with 90 ml. of warm water in 30 ml. increments. The solution was dried over potassium sulfate and calcium chloride. It was then filtered and the solvent was removed in vacuo. The product was a brown liquid of about the same viscosity as the starting material. It possessed an acid number of 19.6, an I.V. of 0.12, and a microstructure of 11.5% cis, 66.8% trans, and 21.7% vinyl. Its infrared spectrum indicated no (or very little) hydroxyl content.

Example III.—Conversion of hydroxy-terminated polybutadiene to carboxy-terminated polybutadiene using boron trifluoride catalysis 60. g. of polybutadiene diol and 240 g. of tris-trichloroethane was placed in a 500 ml. flask as in the foregoing examples, along with 0.6 g. of antioxidant, 8.2 g. of succinic anhydride and 0.8 ml. of $BF_3 \cdot 2C_6H_5OH$ (phenol complex of boron trifluoride). The mixture was refluxed for 6 hours and worked up as in Example 2. The product was a viscous liquid, of higher viscosity than the substrate but still pourable. Its acid number was 19.4, I.V. 0.21, and cis, trans, vinyl content 16.3%, 62.5%, and 21.1% respectively. Its infrared spectrum showed the presence of some remaining hydroxyl but, nevertheless, much less hydroxyl than in the substrate.

Having thus described my invention, what I claim and desire to protect by Letters Patent is:

1. A method for producing carboxy terminated polymers comprising: mixing a soluble hydroxy terminated elastomer forming polymer with a non-hydrogen halogen containing Lewis acid, a dicarboxylic acid anhydride in a solvent, thereby producing a carboxy terminated polymer.

2. The method of claim 1 wherein said hydroxy-terminated polymer is polybutadiene diol, said Lewis acid is zinc chloride and said acid anhydride is succinic anhydride.

3. The method of claim 1 wherein said Lewis acid is selected from a group consisting of boron fluoride, stannic chloride and zinc chloride.

4. The method of claim 1 wherein said acid anhydride is selected from a group consisting of maleic anhydride, phthalic anhydride and succinic anhydride.

5. A method for producing carboxy terminated polymers comprising mixing a soluble hydroxy terminated elastomer forming polymer with a catalytic amount of a non-hydrogen halogen containing Lewis acid and a molar excess of a dicarboxylic acid anhydride in a solvent, and heating the solution formed thereby to between 70° to 120° C. to produce a carboxy terminated polymer.

References Cited

UNITED STATES PATENTS

| 2,710,292 | 6/1955 | Brown | 260—78.4 |
| 2,798,053 | 7/1957 | Brown | 260—78.5 XR |
| 2,971,946 | 2/1961 | Hayes | 260—78.5 XR |

JOSEPH L. SCHOFER, Primary Examiner

JOHN KIGHT III, Assistant Examiner

U.S. Cl. X.R.

260—94.7